1-552. 3P
-25-75 OR RE28347

SYSTEM FOR DETECTING DEFECTS IN CONTINUOUS TRAVELING MATERIAL

Original Filed April 2, 1971 6 Sheets-Sheet 1

SYSTEM FOR DETECTING DEFECTS IN CONTINUOUS TRAVELING MATERIAL

Original Filed April 2, 1971 6 Sheets-Sheet 2

SYSTEM FOR DETECTING DEFECTS IN CONTINUOUS TRAVELING MATERIAL

Original Filed April 2, 1971 6 Sheets-Sheet 3

SYSTEM FOR DETECTING DEFECTS IN CONTINUOUS TRAVELING MATERIAL

Original Filed April 2, 1971 6 Sheets-Sheet 4

SYSTEM FOR DETECTING DEFECTS IN CONTINUOUS TRAVELING MATERIAL

Original Filed April 2, 1971 6 Sheets-Sheet 5

SYSTEM FOR DETECTING DEFECTS IN CONTINUOUS TRAVELING MATERIAL

Original Filed April 2, 1971 6 Sheets-Sheet 6

United States Patent

Re. 28,347
Reissued Feb. 25, 1975

28,347

SYSTEM FOR DETECTING DEFECTS IN CONTINUOUS TRAVELING MATERIAL

Solomon Abilock, Brooklyn, and Richard Shottenfeld, Jamaica, N.Y., and Thomas Brown, Taylors, S.C., assignors to Lindly & Company, Inc., Mineola, N.Y.

Original No. 3,717,771, dated Feb. 20, 1973, Ser. No. 130,700, Apr. 2, 1971. Application for reissue Mar. 22, 1974, Ser. No. 453,999

Int. Cl. G01n *21/32*

U.S. Cl. 250—562 30 Claims

Matter enclosed in heavy brackets [ ] appears in the original patent but forms no part of this reissue specification; matter printed in italics indicates the additions made by reissue.

ABSTRACT OF THE DISCLOSURE

An inspecting system for detecting defects in continuous traveling material such as a sheet of yarn comprises two detecting units, one disposed upstream of the other. The two units are interconnected by a coordinating circuit which disables the downstream unit except for a short period after an apparent defect has been detected by the upstream unit. The period during which the downstream unit is enabled to function begins just before a defect detected by the upstream unit would have time to reach the downstream unit and ends shortly after such defect would have time to pass the downstream unit. The beginning and end of the period during which the downstream unit is enabled may be controlled by a delay circuit triggered by the upstream unit when it detects an apparent defect and set to provide delay times according to the speed the material is traveling. Alternatively, the period may be determined by a counter counting pulses generated by a pulse generator driven in synchronism with movement of the material so as to compensate automatically for changes in the speed of movement of the material. Since the downstream unit is normally disabled, the likelihood of its being triggered by something other than an actual defect, for example a jumping yarn or an electric discharge, is greatly reduced.

The present invention relates to an inspecting system for detecting defects in continuous traveling material such as yarn, fabric, magnetic tape, ribbon, cord, wire, paper, metal strips and other continuous material. For convenience of explanation and without intending to limit the applicability of the invention, reference is herein made to the inspection of a sheet of yarn, for example in conjunction with a warper.

Yarn inspectors are well known for detecting defects in a sheet of yarn while it is moving. Such yarn inspectors may comprise guide bars over which the yarns run to flatten the yarn sheet, a light source at one side of the sheet for directing a beam of light across the sheet, a photo-detecting head at the opposite side of the sheet in line with the light beam and circuitry for producing a signal when the light received by the detecting head varies a predetermined amount, for example by reason of a defect in one of the yarns of the sheet. The signal thus produced is used as desired, for example to count the defects and to stop the warper or other equipment with which the yarn inspector is used.

In the use of such inspecting equipment, difficulty is encountered by reason of false stops which occur when there is actually no defect. The sensitivity of inspection is limited by "noise" which is not inherent in the electronic system itself but is random and due to external causes, e.g., to surface irregularities or non-uniform motion of the yarn. Sensitivity settings anywhere near the noise level will usually result in falsely triggering the machine due to occasional noise peaks which exceed the general average level of the noise signal itself. In the case of photoelectric inspection of synthetic continuous filament yarn, such as nylon, the most objectionable cause of random noise is "jumping" yarn due to "plucking" in the yarn supply package, poorly wound supply packages and faulty tension devices. However, random noise can also result from electrical interference in the form of spurious signals due, for example, to high voltage spark discharges from nearby static-eliminating devices, radio frequency pick-up, static generated by yarn friction and severe power line fluctuation. False signals can also be caused by random reflections from a jumping yarn, yarn twist and reflection of light from adjacent equipment. Obviously, the occurrence of false signals is undesirable since it results in incorrect defect counts and a false stopping of the machine or process which not only reduces efficiency and total production but may in itself cause defects.

A present trend to increase the quality of materials requires greater and greater sensitivity of inspecting equipment. This increase in sensitivity unavoidably results in an increase in susceptibility of the inspecting equipment to false signals.

It is an object of the present invention to provide an inspecting system which is highly sensitive and yet is virtually immune to actuation by anything other than actual defects.

In accordance with the invention, an inspecting system for detecting defects in continuous traveling material such as sheet yarn comprises two detecting units, one disposed upstream of the other along the path of travel of the material. The two units are interconnected by a coordinating circuit which disables the downstream unit except for a short period after an apparent defect has been detected by the upstream unit. The period during which the downstream unit is enabled to function begins just before a defect detected by the upstream unit would have time to reach the downstream unit and ends shortly after such defect would have time to pass the downstream unit. If there is an actual defect, it will be detected sequentially by both units, whereupon an output signal will be produced by the downstream unit. If, on the other hand, actuation of the upstream unit has been caused by random noise, it is unlikely that the noise will recur as a signal applied to the downstream inspecting unit during the short period of time that the downstream inspecting unit is subsequently enabled by reason of the false signal of the upstream unit. Hence, the downstream unit will produce no output signal. Since the downstream unit is normally disabled, the likelihood of its being triggered by anything other than an actual defect is greatly reduced.

In one embodiment of the invention, the beginning and end of the period during which the downstream unit is enabled is controlled by a delay circuit triggered by the upstream unit when it detects an apparent defect and set to provide delay times according to the speed the material is traveling. Means are provided for controlling the duration of the period during which the downstream unit is enabled and also for controlling the delay between the time the upstream unit detects an apparent defect and the beginning of the enabled period of the downstream unit.

In another embodiment of the invention, the start and stop of the period during which the downstream unit is enabled is determined by a counter which counts pulses generated by a pulse generator driven in synchronism with movement of the yarn or other material being inspected. The pulse generator produces a predetermined number of pulses per unit length of the material passing the pulse generator. The counter is set to produce an output signal when it has counted a number of pulses corresponding to a length slightly less than the distance between the two inspecting units. This signal is applied to start the period during which the downstream inspecting unit is enabled. After a predetermined number of additional pulses have been counted, the counter produces a second output signal to terminate the period the downstream inspecting unit is enabled. The second embodiment of the invention has the advantage that it is not affected by changes in the speed of movement of the material being inspected.

The nature, objects and advantages of the inspecting system in accordance with the invention will be more fully understood from the following description in conjunction with the accompanying drawings which illustrate, by way of example, preferred embodiments of the system.

Figure 1:
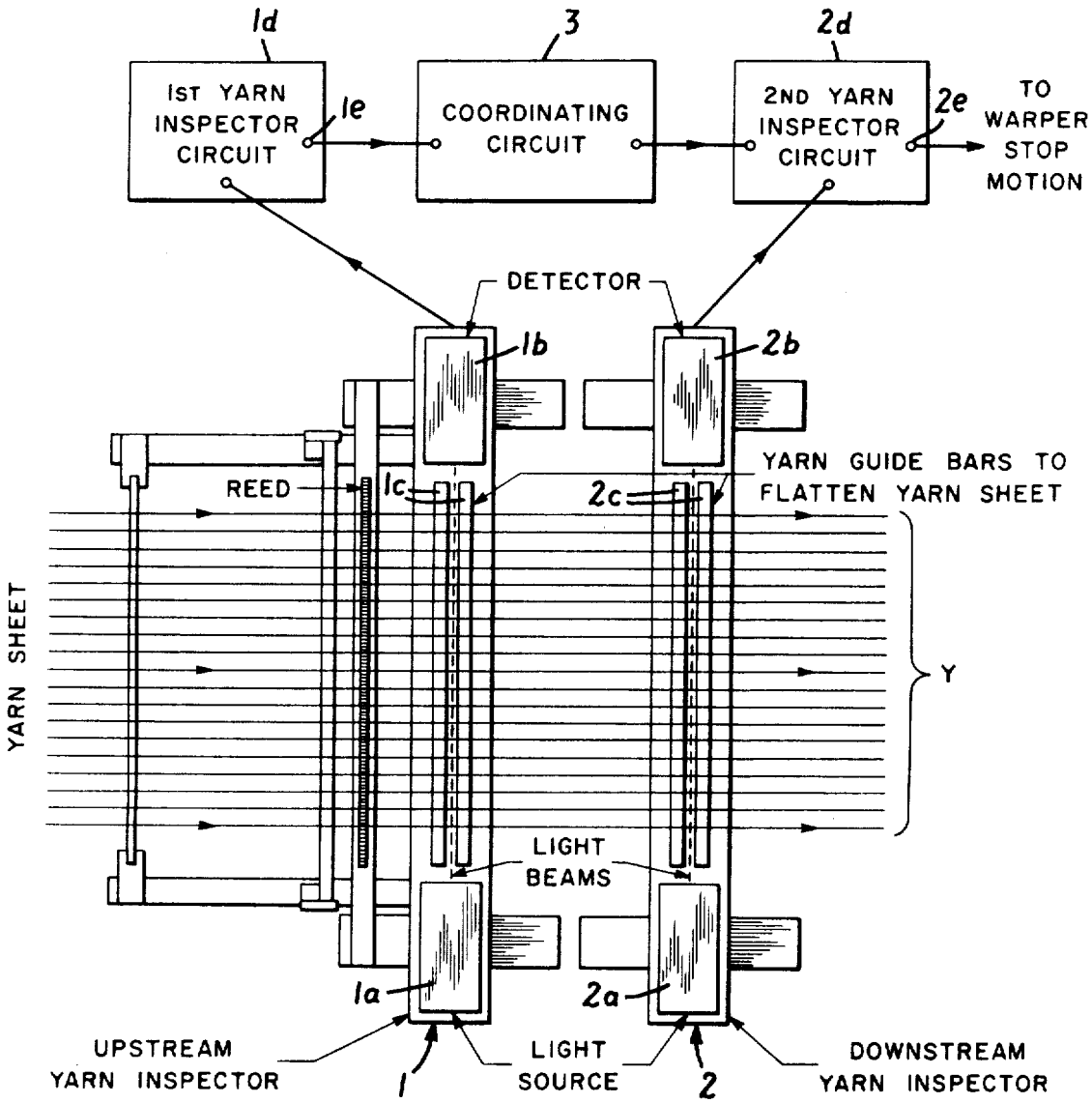
FIG. 1 is a schematic diagram of an inspecting system in accordance with the invention for inspecting a yarn sheet in conjunction with a warper. The system is shown as comprising two inspecting units connected with one another by a coordinating circuit.

The inspecting system shown by way of example in FIG. 1 is designed for inspecting a sheet of yarn and is illustrated as being used in conjunction with a warper. The system is shown as comprising two inspecting units 1 and 2 disposed in sequence along the path of travel of the yarn sheet and spaced a selected distance from one another. With reference to the direction of travel of the yarn sheet Y, as indicated by the arrows, inspecting unit 1 is referred to as the upstream inspecting unit while unit 2 is referred to as the downstream inspecting unit. The upstream inspecting unit comprises a light source 1a located at one side of the yarn sheet and designed to transmit a light beam across the sheet. A photo-detector 1b is located at the opposite side of the yarn sheet in position to receive the light beam transmitted by the light source 1a. Guide bars 1c located just upstream and just downstream of the light beam keep the yarn sheet flat and positioned in the beam so that a shadow of the yarn sheet is projected onto the light-sensitive element of the photo-detector 1b. Any defects in the yarn, such as nodes, balls or other irregularities, cause a variation in the shadow of the yarn sheet and hence in the light received by the photo-detector so as to produce a signal. An electrical circuit 1d includes circuitry for controlling the light source and for amplifying and processing signals received from the photo-detector 1b so as to produce an output signal at an output terminal 1e when a signal of predetermined characteristics is received from the photo-detector.

The downstream inspecting unit 2 similarly comprises a light source 2a, a photo-detector 2b, glide bars 2c and circuitry 2d having an output terminal 2e. The two inspecting units 1 and 2 may, if desired, be of like construction and characteristics. Alternatively, the upstream inspecting unit 1 may be of relatively simple design *as disclosed for example in Pat. 2,878,395* while the downstream inspecting unit 2 may be more sophisticated so as to detect, for example, different magnitudes of defects [the length of defects] and the number of defects per unit length of yarn *as disclosed for example in Pat. 3,543,360.*

The two inspecting units are interconnected by a coordinating circuit 3 by means of which the upstream inspecting unit 1 controls the downstream inspection unit 2 so that the downstream unit is disable except for a short period of time at a selected interval after the upstream unit has detected an apparent defect in a yarn of the yarn sheet. The period during which the downstream inspecting unit 2 is enabled to function to produce an output signal begins at a time after detection of an apparent defect by the upstream inspecting unit 1 just less than the time required for a defect to travel from the upstream unit to the downstream unit and ends at a time slightly longer than the time required for the defect to travel from one unit to the other. Hence, if the upstream inspecting unit 1 detects an actual defect, such defect will also be detected by the downstream inspecting unit 2 during the short period of time when it is enabled by the cordinating circuit 3. A signal will thereby be produced at the output terminal 2e of the downstream inspecting unit 2. The signal thus produced may be utilized as desired, for example to actuate a counter which counts the number of defects in the yarn sheet, or to actuate a stop-motion relay for stopping the warper or other equipment with which the inspecting system is installed so as to permit repair of the detected defect.

Figure 2:
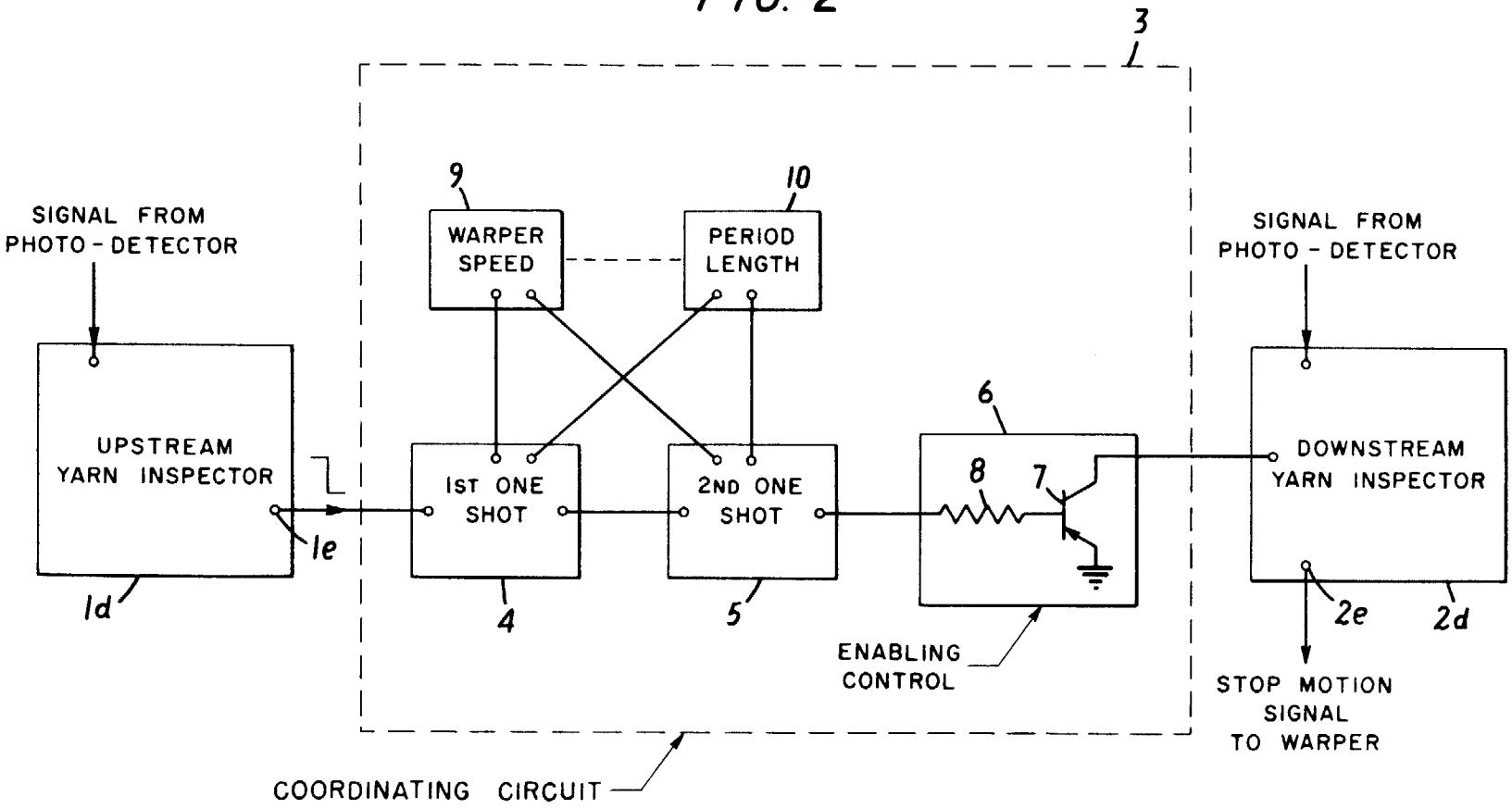
FIG. 2 is a block diagram of the circuitry of the inspecting system shown in FIG. 1.

In the embodiment shown by way of example in FIG. 2, the coordinating circuit 3 comprises a first monostable or "one-shot" multivibrator 4, a second monostable or "one-shot" multivibrator 5 and an enabling control 6 which alternatively inhibits or enables operation of the downstream inspecting unit 2. The enabling control 6 is shown, by way of example, as comprising a transistor 7, the base of which is connected with the second one-shot multivibrator 5 through a resistance 8. The emitter is shown as being connected to ground while the collector is connected to the downstream yarn inspector 2 in such manner as to disable the yarn inspector when the transistor 7 is conducting, for example by grounding the connection from the photo-detector to the yarn inspector circuit. With the connections shown, the transistor 7 is conducting and the downstream yarn inspector 2 is accordingly disabled except for a short period of time after an apparent defect has been detected by the upstream yarn inspector 1.

The first one-shot multivibrator 4 comprises a delay circuit which determines the length of time the downthe detection of an apparent signal by the upstream yarn inspector 1 and the beginning of a period during which the downstream yarn inspector 2 is enabled to detect a defect. The second one-shot multivibrator 5 comprises a delay circuit which determines the length of time the downstream yarn inspector 2 remains enabled.

When an apparent defect is detected by the upstream yarn inspector 1, it transmits a signal to the first one-shot multivibrator 4 to trigger the multivibrator and start its cycle of operation. When the first one-shot multivibrator 4 has completed its cycle, it transmits a signal to the second one-shot multivibrator 5 to start its cycle of operation and to render the transistor 7 of the enabling control circuit 6 non-conducting so that the downstream yarn inspector 2 is able to detect a defect and thereupon to produce an output signal at the output terminal 2e. When the second one-shot multivibrator 5 has completed its cycle, it produces a signal to cause the transistor 7 again to become conductive so as to disable the downstream yarn inspector 2.

A control 9 is provided for variably setting the delay time provided by the first one-shot multivibrator 4 and thereby determining the interval of time between the detection of an apparent defect by the upstream yarn inspector 1 and the beginning of the period during which the downstream yarn inspector 2 is enabled. The control 9 is set according to the warper speed and the distance between the two inspecting units. A control 10 is provided for setting the delay time provided by the second one-shot multivibrator 5 and thereby determining the length of the period during which the downstream yarn inspector 2 is enabled. The control 10 is set according to the operating parameters and particularly the constancy of the speed of travel of the material being inspected. If the speed of travel of the material is subject to fluctuation, it is desirable to make the period during which the downstream yarn inspector is enabled sufficienly long that a defect detected by the upstream unit will also be detected by the downstream unit while the latter is enabled despite variations in yorn inspectors is well known, the circuit 1d of the up- the period during which the downstream yarn inspector is enabled as short as possible in order to minimize the possibility of a false signal. The controls 9 and 10 are interconnected so that when the duration of the period during which the downstream yarn inspector is enabled is increased, the time between the detection of a defect by the upstream unit and the beginning of the period the downstream unit is enabled is decreased by approximately half the amount the length of the period is increased. The period during which the downstream unit is enabled is thereby set so that it extends approximately equally before and after the theoretical time that a defect detected by the upstream unit will reach the downstream unit. When the warper speed control is set to a higher speed indication, the delay and the duration of the enable period are both decreased proportionally.

Figure 3:
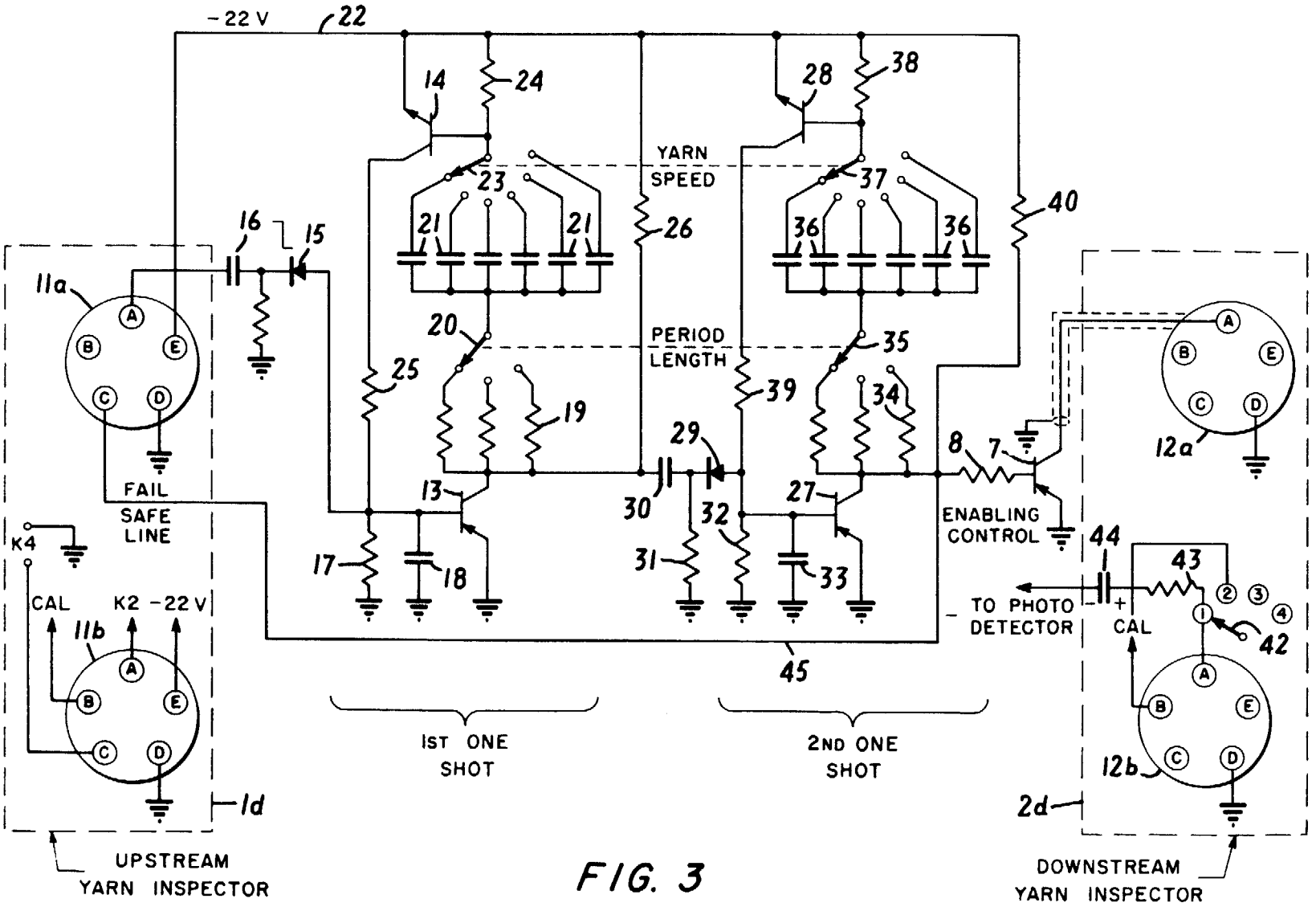
FIG. 3 is a circuit diagram showing in more detail the circuitry of the coordinating circuit and its connections with the circuitry of the two inspecting units.

A circuit for carrying out the present invention is shown in more detail in FIG. 3. As the circuitry of commercial yarn inspectors is well known, the circuit 1d of the upstream yarn inspector is not shown except for a connecting plug 11a fitting into a receptacle 11b with connections in accordance with the present invention. In like manner, the circuitry 2d of the downstream yarn inspector is not shown except for a connecting plug 12a fitting into a receptable 12b with connections to the circuitry in accordance with the invention. The coordinating circuit between the two yarn inspectors includes a complementary one-shot which comprises transistors 13 and 14 and corresponds to the one-shot 4 shown in the block diagram of FIG. 2. The base of the transistor 13 is connected through a diode 15 and capacitor 16 with terminal A of the connecting plug 11a which fits in socket A of the receptacle 11b and thereby connects with a component K2 of the yarn inspector circuitry which provides an output signal when an apparent defect is detected by the upstream yarn inspector. For example, connection may be made to the actuating coil of a relay in the usual stop-motion circuit. The base of the transistor 13 is also connected to ground through a resistor 17 in parallel with a capacitor 18. The emitter of the transistor 13 is connected to ground while the collector is connected to the base of the transistor 14 through an RC circuit comprising a plurality of resistors 19 of different values selectable by a selecting switch 20 and a plurality of capacitors 21 of different values selectable by a selecting switch 23. The base of the transistor 14 is further connected through a resistor 24 to a power supply line 22 which is shown, by way of example, as a −22 volt line connected through a pin E of the connecting plug 11a with a suitable power supply in the upstream yarn inspector circuit. The emitter of transistor 14 is connected to the negative voltage line 22 while the collector is connected through a resistor 25 to the base of the transistor 13. The collector of the transistor 13 is also connected through a resistor 26 with the negative voltage line 22.

A second complementary one-shot corresponding to the one-shot 5 shown in the block diagram of FIG. 2 is shown as comprising transistors 27 and 28 with associated circuitry. The base of the transistor 27 is connected through a diode 29 and capacitor 30 with the collector of the transistor 13 of the first one-shot. The connection between the diode 29 and capacitor 30 is connected to the ground through a resistor 31. The base of the transistor 27 is also connected to ground through a resistor 32 in parallel with a capacitor 33. The emitter of the transistor 27 is connected to ground while the collector is connected to the base of the transistor 28 through an RC circuit comprising a plurality of resistors 34 of different value selectable by a selecting switch 35 and a plurality of capacitors 36 of different values selectable by a selecting switch 37. The base of the transistor 28 is also connected to the negative voltage line 22 through a resistor 38. The emitter of the transistor 28 is connected to the voltage line 22 while the collector is connected through a resistor 39 to the base of the transistor 27. The collector of the transistor 27 is also connected through a resistor 40 to the voltage line 22 and through a resistor 8 to a transistor 7 which corresponds to the transistor 7 of the enabling control circuit 6 shown in the block diagram of FIG. 2. The emitter of the transistor 7 is connected to ground while the collector is connected through a ground-shielded conductor to contact pin A of the connector plug 12a which fits into socket A of receptable 12b of the circuit of the downstream yarn inspector, the socket A is connected to contact No. 1 of a selector switch 42. The contact pin No. 1 of the selector switch 42 is connected through a resistor 43 and capacitor 44 to the photo-detector of the downstream yarn inspector while the movable contact of switch 42 is connected to the input of the amplifying and logic circuit of the yarn inspector. Hence, when the transistor 7 is conducting and saturated, the signal input circuit from the photo-detector of the downstream yarn inspector is grounded and the yarn inspector is thus disabled so that it will not respond to a signal from the photo-detector.

In normal operation of the circuitry shown in FIG. 3, when there is no defect in the yarn or other material being inspected, transistors 13, 14, 27 and 28 of the two one-shots are non-conducting while the transistor 7 of the enabling control circuit is conducting so as to disable the downstream yarn inspector. When an apparent defect is detected by the upstream yarn inspector, a negative-going signal is transmitted through the capacitor 16 and diode 15 to the base of the transistor 13 so as to render the transistor conducting. Through the connections between the two transistors, the second transistor 14 is also turned on and a feed-back through the resistor 25 results in turning on transistor 13 harder. After a time interval determined by the RC circuit as set by the selector switches 20 and 23, the selected capacitor 21 is charged to the point where conduction of the transistor 14 is not maintained so that the transistor becomes non-conducting. This results in turning off the transistor 13, thereby producing in the collector circuit of the transistor a negative-going signal which is transmitted through the capacitor 30 and diode 29 to the base of the transistor 27. This results in turning on the transistor 27 and hence also transistor 28 which feeds back through the resistor 39 to lock both transistors 27 and 28 in conducting condition. When the transistor 27 becomes conducting, the base of the transistor 7 is connected through the resistor 8 to ground so that the transistor 7 is rendered non-conducting and the downstream yarn inspector is enabled to respond to any signal received from its photo-detector. After a time interval determined by the setting of the selector switches 35 and 37, the selected capacitor 36 becomes charged to a point where the base current of the transistor 28 is not sufficient to maintain conduction, whereupon transistor 28 ceases to conduct and thereby turns off transistor 27. When the transistor 27 becomes non-conducting, the voltage applied to the base of the transistor 7 becomes more negative by reason of connections through the resistor 8 and resistor 40 to the negative voltage line 22 so that the transistor 7 again becomes conducting and thereby disables the downstream yarn inspector so that it will not respond to a signal from its photo-detector. It will thus be seen that the downstream yarn inspector is enabled to respond to a signal only during the interval when the transistors 27 and 28 of the second one-shot multivibrator are conducting and transistor 7 is non-conducting. At the conclusion of the conducting cycle of each one-shot multivibrator, the selected timing capacitor 21 is discharged through resistors 24, 19 and 26 in the case of the first one-shot and similarly for the second one-shot through resistors 38, 34 and 40.

The selector switches 23 and 37 are interconnected and correspond to the warper speed control 9 illustrated in the block diagram of FIG. 2. The selector switches 20 and 35 are similarly interconnected and correspond to the period length control 10 in the block diagram. By suitably setting the selector switches, it is possible to select the time interval between the detection of an apparent defect by the upstream yarn inspector and the beginning of the "enabled" period of the downstream yarn inspector and also set the length of the period during which the downstream yarn inspector is enabled.

A safety feature of the circuitry shown in FIG. 3 is provided by the fact that the power supply line 22 of the coordinating circuit is derived from the circuit of the upstream yarn inspector and the junction point between resistors 8 and 40 (in the base circuit of transistor 7) is connected through a "fail-safe" line 45 to pin C of the connector plug 11a of the upstream yarn inspector. The corresponding socket C of the receptacle 11b is connected to ground through a relay K4 in the upstream yarn inspector circuit. The relay K4 is biased to closed condition but when the upstream yarn inspector is in normal operation the relay is energized so as to remain open. In the event the upstream yarn inspector is in any way disabled so as to become inoperative, the relay K4 closes so as to ground the junction between resistors 8 and 40 in the base circuit of the transistor 7 and thereby render the transistor non-conducting. The downstream yarn inspector is thereby enabled to respond to any signal received from its photo-detector. Suitable signal means is provided to indicate the inoperative condition of the upstream yarn inspector so that it can be corrected. In the meantime, the downstream yarn inspector will respond to all signals received from its photo-detector whether real or false.

In some instances it is desirable to make the delay between the detection of an apparent signal by the upstream yarn inspector and the beginning of the "enabled" period of the downstream yarn inspector vary automatically with the speed of travel of the material being inspected so that no manual adjustment is required. One mode of accomplishing this is illustrated in FIG. 4 while another is shown in FIG. 5.

Figure 4:
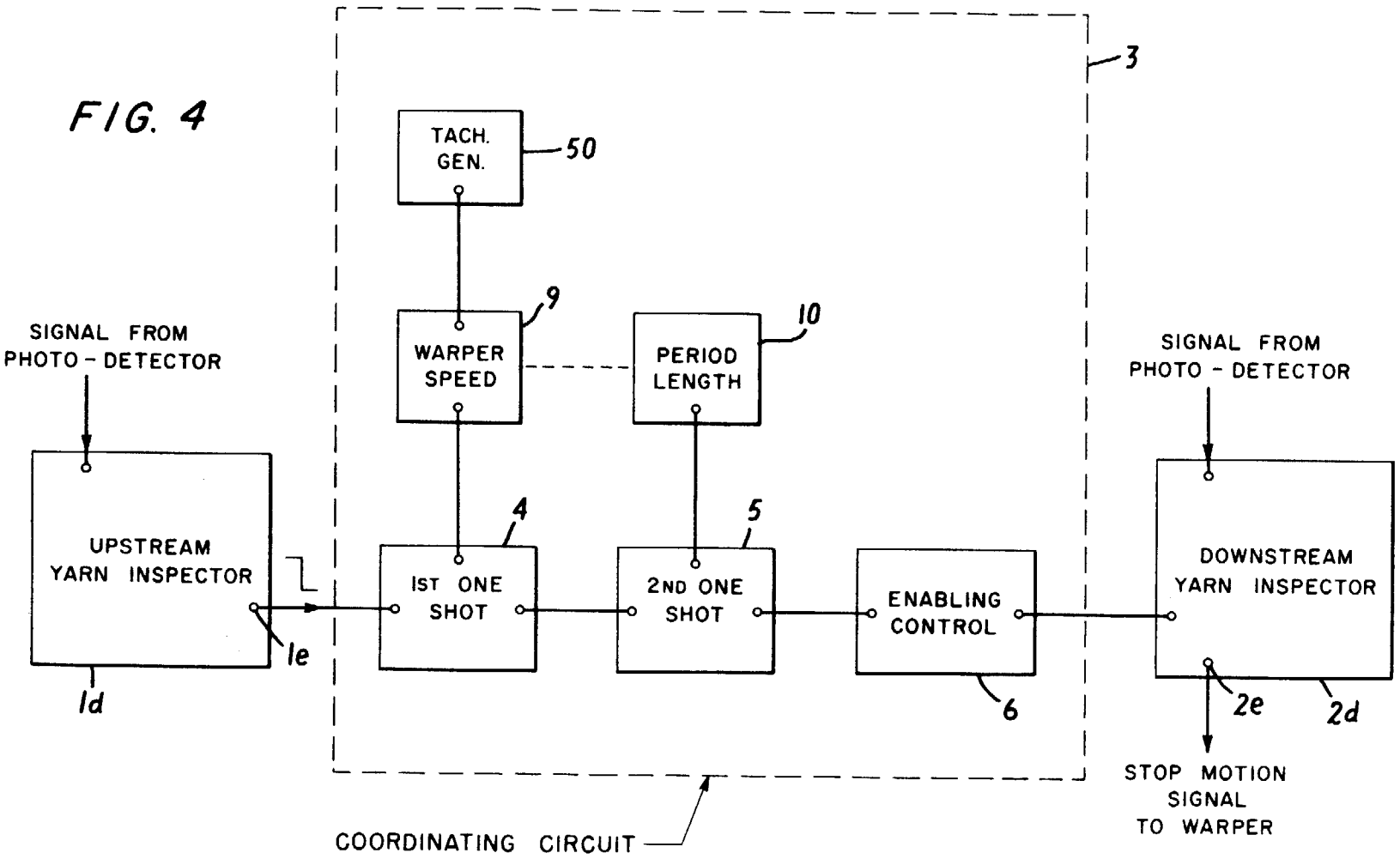
FIGS. 4, 5 and 6 are block diagrams showing schematically other embodiments of the coordinating circuit and its connection with the circuitry of the two inspecting units.

FIG. 4 is a block diagram of a circuit similar to that shown in FIG. 2, corresponding parts being designated by the same reference numerals. The circuit of FIG. 4 functions in the same manner as that of FIG. 2 except that the warper speed control 9 instead of, or in addition to, being manually adjustable is controlled by a speed-responsive circuit 50, for example a circuit comprising a tach-generator which is driven at a speed corresponding to the speed of movement of the material being inspected. For example, when the inspection system is installed in conjunction with a warper, the tach-generator may be driven by the measuring roll of the warper or by a roll or pulley driven by one or more of the yarns. The speed control circuit 50 is connected with the warper speed control 9 in such manner that when the yarn speed increases, the delay time provided by the first one-shot multivibrator 4 decreases proportionally and, conversely, when the yarn speed decreases, the delay time proportionally increases. This may be conveniently accomplished, for example, by using a variable voltage produced by a tach-generator to charge the capacitor or capacitors of an RC circuit controlling the delay time of the first one-shot multivibrator 4. With such an arrangement, an increase in yarn speed results in a higher voltage produced by the tach-generator which charges the capacitor more quickly and thereby reduces the delay time. As in the embodiment of FIG. 2, the warper speed control 9 and period length control 10 are interconnected so that, if the period length as provided by the delay time of the second one-shot multivibrator 5 is increased a given amount, the delay time provided by the first one-shot multivibrator is decreased by approximately half that amount.

Figure 5:
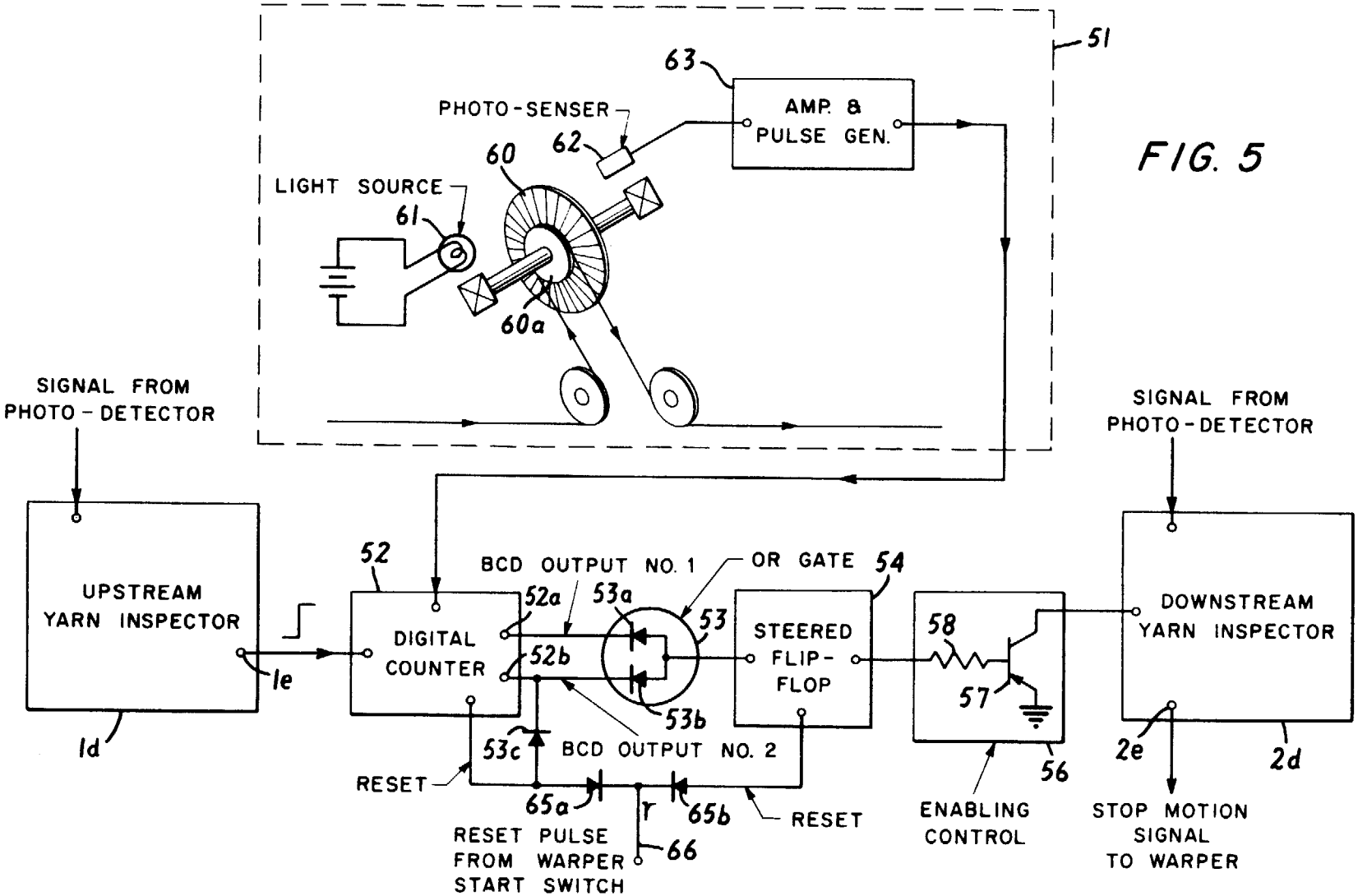

In FIG. 5, the coordinating circuit between the circuit 1d of the upstream yarn inspector and the circuit 2d of the downstream yarn inspector is shown as comprising a distance-measuring pulse generator 51, a digital counter 52, an OR gate 53, a steered flip-flop 54 and an enabling control circuit 56 which corresponds to the circuit 6 of FIG. 2 and in like manner comprises a transistor 57 and resistance 58.

The pulse generator 51 produces pulses at a rate corresponding to the rate of movement of the yarn or other material being inspected. It is shown by way of example as comprising a disc 60 which is rotated by movement of the yarn or other material, for example by being connected to the measuring roll of a warper or by running one or more strands over a roller or pulley 60a fixed to the disc. The disc 60 is provided with one or more indices which are detectable by a sensing unit as the disc rotates. For example, the disc is provided with circumferentially spaced, transparent or opaque lines which are illuminated by a light source 61 and detected by a photosensor 62 as the disc rotates. Alternatively, the disc 60 may be provied with spaced magnetic poles which are sensed by a magnetic pick-up circuit. The pulses produced by the photo- or other sensor 62 are suitably amplified and shaped by a circuit 63 and fed to the input of the digital counter 52. The number of pulses produced will correspond to the length of material moving past the pulse generator. For example, the parameters of the pulse generator may be selected to provide ten pulses for each inch of movement of the material.

The digital counter 52 is of well known circuit configuration comprising a sufficient number of steered flip-flops to be capable of indicating by the states of the various outputs any number up to a predetermined maximum. Such indication is well known and is in the form of binary numbers. Diode matrices associated with the flip-flops are connected so as to produce an output pulse when any particular binary number is reached. One or more such matrices may be used when output pulses are required for several different numbers. In the present instance, diode matrices are provided so as to provide a first BCD signal when the count has reached a first predetermined value and a second BCD output signal when the count has reached a second predetermined value. Provision is preferably made for setting the count values at which the output signals are produced as desired.

When the material being inspected is moving, pulses are continually fed by the pulse generator 51 to the digital counter 52. However, the digital counter has an "enable" input which prevents any functioning of the counter except when an "enable" signal has been received from the upstream yarn inspector. When an enable signal is received, the counter 52 begins counting pulses received from the pulse generator 51. When the count has reached a predetermined value, a first output signal is produced at a first BCD output 52a. The counting continues and when a second predetermined value is reached an output signal is produced at a second BCD output terminal 52b. The counting is thereupon automatically stopped and the counter is reset to zero.

The digital counter 52 is connected with the steered flip-flop circuit 54 through the OR gate 53 shown as comprising two diodes 53a and 53b connected, respectively, with the outputs 52a and 52b of the digital counter 52. The diodes have a common output connected to an input of the steered flip-flop 54.

The steered flip-flop 54 is a well known two-transistor circuit having two complementary outputs, two complementary inputs, each of which can be used to trigger the circuit to one of two possible states, and a third input through which pulses can be fed to trigger the circuit alternatively between two possible states in response to successive input pulses applied to the third terminal. In the present instance, only one output terminal, one input terminal and the steering terminal are used. The output terminal is connected through the resistance 58 to the transistor 57 of the enable control circuit 56. When, for example, a —22 volt supply is used, the voltage of the output terminal of the steered flip-flop will be —22 volts or ground, depending on the state of the flip-flop. When —22 volts is applied through the resistor 58 to the base of the transistor 57, the transistor is conducting so as to disable the downstream yarn inspector, as described above. When the base of the transistor is grounded, the transistor is non-conducting so that the downstream yarn inspector is enabled to signal when the warper or other equipment starts, to set the flip-flop in a state so as to disable the downstream yarn inspector. The reset line 66 is also connected through a diode 65a with the digital counter so as to reset the counter to zero when the equipment is started.

The operation of the system illustrated in FIG. 5 will be described, by way of example, as applied to a warper. When the warper is started, a pulse from the starting circuit is supplied through the reset line 66 to reset the digital counter 52 to zero and to set the flip-flop 54 to a state in which the downstream yarn inspector is inhibited. As the warper runs, pulses are generated by the pulse generator 51 but the pulses are not counted by the digital counter 52 because it has not yet been "enabled" by the upstream yarn inspector. When the upstream yarn inspector detects an apparent defect, it provides an enabling signal so that the digital counter 52 begins to count pulses received from the pulse generator 51. When the counter has counted a number of pulses which corresponds to a length of material, for example one inch less than the distance between the inspection points of the upstream and downstream yarn inspectors, the BCD output 52a transmits a pulse through diode 53a in the OR gate 53 to the steering terminal of the steered flip-flop 54, causing the flip-flop to change from one state to the other and thereby cause the transistor 57 of the enable control circuit 56 to become non-conducting. If the downstream yarn inspector, which is thereby enabled, detects the defect, it produces an output signal which actuates stop-motion circuitry to stop the warper. If the apparent defect detected by the upstream yarn inspector was not an actual defect but caused, for example, by a jumping yarn, no defect will be detected by the downstream yarn inspector after it has been enabled. In this event, a second signal is produced by the digital counter at the BCD output 52b when the count has reached a value corresponding, for example, to a length which is 1 inch greater than the distance between the inspection points of the two yarn inspectors. This signal is transmitted through the diode 53b of the OR gate to reset the steered flip-flop 54 to its original state, whereupon the transistor 57 becomes conductive to again disable the downstream yarn inspector. At the same time, the pulse at BCD output 52b is fed through a diode 53c to the digital counter reset terminal to reset the count to zero and at the same time disable the counter so that no further counts are made until detection of the next apparent defect by the upstream yarn inspector. Pulses are continued to be generated by the pulse generator 51 but they are not counted until another enabling signal is received from the upstream yarn inspector upon detection of another apparent defect.

The enabling circuit for the digital counter may be integral with the counter, in which case a "count enable" terminal is provided for accepting the defect signal pulse from the upstream yarn inspector to enable or start the count. Instead of being in the digital counter 52, the count-enabling control may be in the pulse generator 51 or connected between the pulse generator and the digital counter so that pulses are not fed to the digital counter except when the circuit has been "enabled" by a signal from the upstream yarn inspector.

Instead of being counted by a digital counter, as described above, the pulses generated by a distance-measuring pulse generator such as that shown in FIG. 5 may be fed to a frequency-DC current converter of known construction so as to produce a direct current or DC voltage proportional to the frequency of the pulses and, hence, proportional to the speed of movement of the material being inspected. Such direct current or DC voltage is then used to control the delay time between the detection of an apparent defect by the upstream yarn inspector and the beginning of the enabled period of the downstream yarn inspector, for example by circuitry like that illustrated by way of example in FIG. 4. Alternatively, a tachometer or DC generator may be used to generate a DC voltage or current proportional to the speed of movement of the material without first producing pulses.

Instead of being used to enable or disable the downstream yarn inspector internally, a signal from the enabling control circuit 6, as shown for example, in FIG. 2, may be used to control the transmission of a signal from the downstream yarn inspector to a stop-motion control or other control of the equipment. Such an arrangement is illustrated, by way of example, in FIG. 6 which is similar to the block diagram of FIG. 2, corresponding components being designated by the same reference characters. It will be seen that an output of the control circuit 6 and the output 2e of the downstream yarn inspector are connected to inputs of an AND gate 70 the output of which is connected to the stop-motion circuit or other control of the equipment with which the inspecting system is used. The sign and voltage of the output signals of the control circuit 6 and the downstream yarn inspector are selected so as to be compatible. With the circuitry shown in FIG. 6, it will be seen that a signal produced by the upstream yarn inspector, when an apparent defect is detected, is delayed and expanded to a predetermined length by the coordinating circuit 3 which transmits the delayed and expanded signal to the AND gate 70. If, during the period, the AND gate 70 is, in effect, "enabled" by the signal from the coordinating circuit 3, a signal is received from the output 2e of the downstream yarn inspector, the AND gate produces an output signal transmitted to the stop-motion or other control circuitry. The delay and expansion of the signal from the upstream yarn inspector are determined in accordance with the speed of movement of the yarn and the distance between the yarn inspectors so that, if the upstream yarn inspector has been triggered by an actual defect, the defect will reach, and be detected by, the downstream yarn inspector during the interval the AND gate 70 is enabled.

Figure 6:
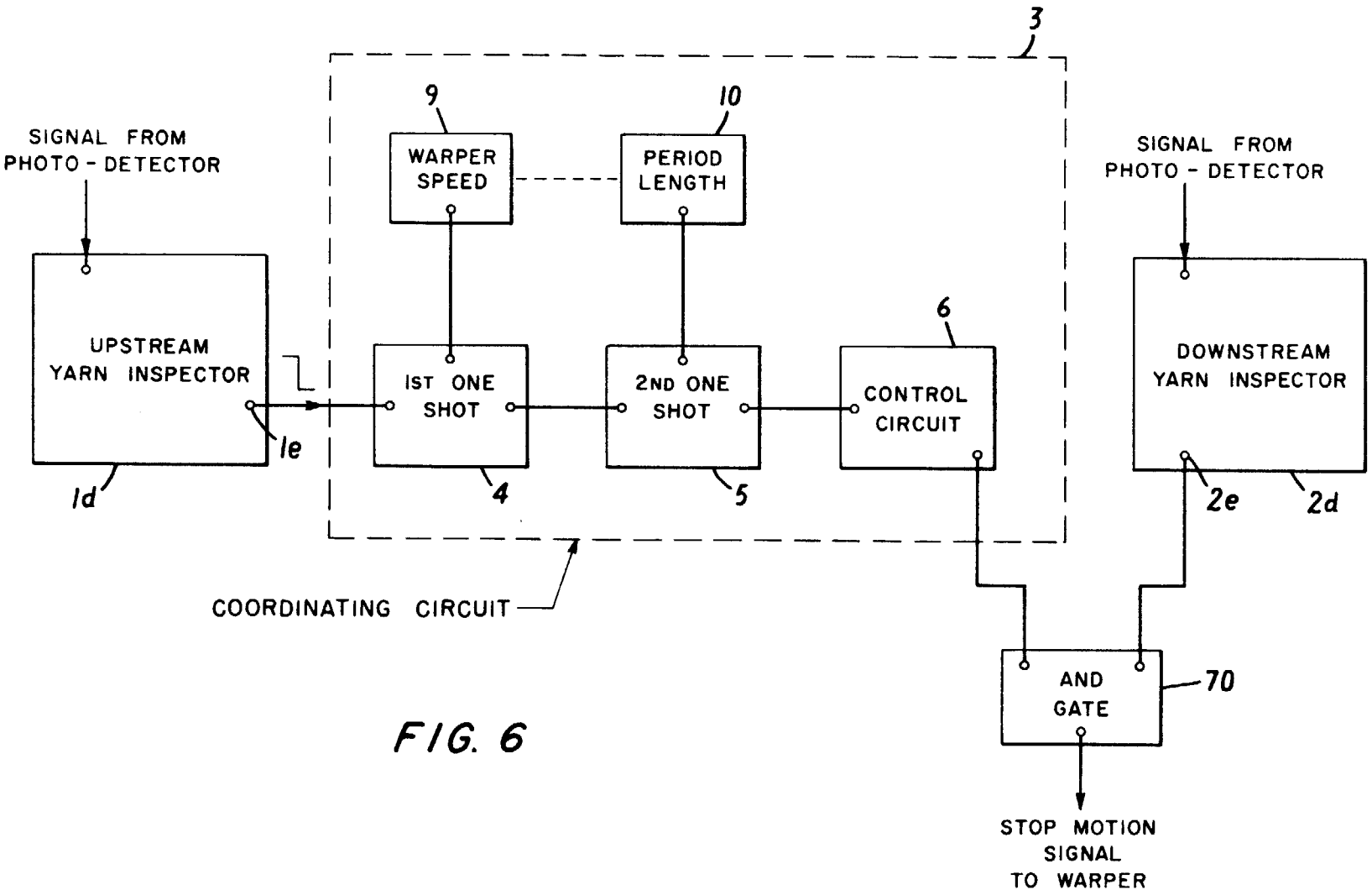

It will be understood that the use of an AND gate, as illustrated in FIG. 6, is applicable not only to the circuitry illustrated in FIG. 2 but also to that of FIGS. 3, 4 and 5. Moreover, features of the several embodiments herein illustrated and described are interchangeable insofar as they are compatible. Other modifications of circuitry will be apparent to those skilled in the art to attain the coordination of the upstream and downstream yarn inspectors as herein described.

What we claim and desire to secure by Letters Patent is:

[1. A method of inspecting continuously travelling linear material to detect defects therein, which comprises moving said material continually at a constant speed successively past an upstream inspecting unit and a downstream inspecting unit, each of which is operable to detect a defect of predetermined nature in said material, continuously operating said upstream unit to inspect said material for defects as it moves past said upstream unit, controlling a delay means by said upstream inspecting unit to initiate operation of said delay means upon detection of an apparent defect by said upstream unit to measure a first period ending at a time slightly less than the time required for a defect to travel at said constant speed from said upstream unit to said downstream inspecting unit and a second period ending at a time slightly greater than said time required for a defect to travel at said constant speed from said upstream unit to said downstream inspecting unit, and controlling said downstream unit by said delay means to disable said downstream unit at all times except for a selected short interval beginning at the end of said first period and ending at the end of said second period, whereby said downstream inspecting unit is enabled for only a short interval during which said apparent defect, if a real defect, will appear at said downstream inspecting unit with said material moving at said constant speed.]

[2. A method according to claim 1, in which said defects are detected photoelectrically.]

[3. A method according to claim 2, in which the delay time between the detecting of an apparent defect by said upstream unit and the enabling of said downstream unit is set according to the speed of movement of said material and the distance between said units.]

[4. A method according to claim 3, in which the duration of the interval said downstream unit is enabled is set according to the speed of movement of said material.]

[5. A method according to claim 2, in which the delay time between the detection of an apparent defect by said upstream unit and the enabling of said downstream unit is varied in accordance with variation in the speed of movement of said material.]

[6. An inspecting system for detecting defects in material travelling continuously at a selected constant speed, comprising first detecting means located on the path of travel of said material for detecting an apparent defect in said material as it passes said first detecting means, second detecting means located on the path of travel of said material a selected distance downstream of said first detecting means for detecting a defect as it passes said second detecting means, each said detecting means including means for producing an output signal upon detecting an apparent defect, said first detecting means operating continuously to detect apparent defects in said material as it moves past said first detecting means at said constant speed, control means controlling said second detecting means selectively to inhibit the operation of said second detecting means and to enable the operation of said second detecting means to produce an output signal on the detecting of a defect, said control means normally inhibiting the operation of said second detecting means, and means for coordinating the operation of said first detecting means and said second detecting means, said coordinating means comprising delay means for providing a first delay period ending at a time slightly less than the time required for a defect to travel at said constant speed from said first detecting means to said second detecting means and a second delay period ending at a time slightly greater than said time required for a defect to travel at said constant speed from said first detecting means to said second detecting means, said delay means being normally inactive, means connecting said delay means with said first detecting means to activate said delay means when an apparent defect is detected by said first detecting means and means connecting said delay means with said control means of said second detecting means to enable said second detecting means at the end of said first period and to disable said second detecting means at the end of said second period, whereby said second detecting means is enabled for only a short interval during which said apparent defect, if a real defect, will appear at said second detecting means with said material travelling at said constant speed.]

[7. An inspecting system according to claim 6, in which said coordinating means includes means for selectively setting the length of the interval said second detecting means is enabled.]

[8. An inspecting system according to claim 7, in which said coordinating means comprises means for selectively varying said first delay period between the detecting of an apparent defect by said first detecting means and the beginning of said interval said second detecting means is enabled.]

[9. An inspecting system according to claim 6, in which said coordinating means comprises means responsive to the travel of said material to actuate said control means to start said interval during which said second detecting means is enabled.]

[10. An inspecting system according to claim 9, in which said means responsive to travel of said material comprises pulse generating means located on the path of travel of said material and coordinated with the travel of said material to generate a selected number of pulses per unit length of said material passing said pulse generating means, and means responsive to said pulses and for providing an output signal for starting said interval during which said second detecting means is enabled when a predetermined number of pulses have occurred.]

[11. An inspecting system according to claim 10, in which said means responsive to said pulses comprises a binary digital counter.]

[12. An inspecting system according to claim 10, in which said means responsive to said pulses comprises means for providing a second output signal to terminate said interval during which said second detecting means is enabled when a predetermined number of additional pulses have occurred.]

[13. An inspecting system according to claim 10, in which said pulse generating means comprises a rotatable member driven by said material and having a selected number of circumferentially spaced discontinuities, and a detector positioned to sense the passage of said discontinuities past said detector.]

[14. An inspecting system according to claim 13, in which said detector is photoelectric.]

[15. An inspecting system according to claim 11, further comprising means for starting the travel of said material, and connections between said starting means and said counting means to reset said counting means when travel of said material is started.]

[16. An inspecting system according to claim 7, in which said coordinating means comprises first means for selectively varying said first delay period, second means for selectively varying said second delay period and means interconnecting said first and second means to vary said first and second delay periods in predetermined relation to one another.]

[17. An inspecting system according to claim 6, in which said delay means comprises a first one-shot multivibrator including a delay circuit providing said first delay period and a second one-shot multivibrator including a delay circuit providing said second delay period.]

[18. An inspecting system according to claim 17, in which each of said delay circuits includes a variable component for varying the respective delay period and means for varying said components.]

[19. An inspecting system according to claim 18 comprising means interconnecting said means for varying said variable components of said delay circuits to vary said first and second delay periods in predetermined relation to one another.]

[20. An inspecting system according to claim 17, comprising means responsive to the speed of travel of said material and means connecting said speed responsive means with said delay means to determine said delay periods according to the speed detected by said speed responsive means.]

[21. An inspection system for detecting defects in continuous traveling material comprising first detecting means located on the path of travel of said material for detecting an apparent defect in said material as it passes said first detecting means, second detecting means located on the path of travel of said material a selected distance downstream of said first detecting means for detecting a defect as it passes said second detecting means, each of said detecting means including means for producing an output signal upon detecting an apparent defect, said first detecting means operating continuously to detect apparent defects in said material as it moves past said first detecting means, control means controlling said second detecting means selectively to inhibit the operation of said second detecting means and to enable the operation of said second detecting means to produce an output signal on detection of a defect, said control means normally inhibiting the operation of said second detecting means, and means coordinating the operation of said first detecting means and said second detecting means, said coordinating means comprising means for measuring the material passing said detecting means, means connecting said measuring means to said first detecting means to start measurement of said material when an apparent defect is detected by said first detecting means, and means connecting said measuring means with said control means to enable said second detecting means only when the length of material measured is slightly less than the distance between said first and second detecting means along the path of travel of said material and to disable said second detecting means when the length of material measured is slightly more than said distance, whereby said second detecting means is enabled for only a short interval during which an apparent defect detected by said first detecting means would, if an actual defect, pass said second detecting means.]

[22. An inspecting system according to claim 21, in which said measuring means comprises means for generating a signal pulse for each selected increment of travel of said material and means responsive to said pulses to provide a first signal to enable said second detecting means when a predetermined number of pulses have occurred and to provide a second signal to disable said second detecting means when a predetermined greater number of pulses have occurred.]

[23. An inspecting system according to claim 22, in which said means responsive to said pulses to provide said first and second signals comprises a binary counter for counting said pulses.]

[24. An inspecting system according to claim 23, comprising means for resetting said counter when a defect is detected by said second detecting means.]

[25. An inspecting system according to claim 23, comprising means responsive to said second signal for stopping the counting and resetting said counter.]

[26. A method according to claim 1, in which said second delay period is started at the end of said first delay period, whereby said delay periods occur sequentially.]

[27. An inspecting system according to claim 6, in which said delay means comprises a first delay circuit providing said first delay period and a second delay circuit providing said second delay period and means interconnecting said circuits to start said second delay period at the end of said first delay period.]

[28. An inspecting system according to claim 6, in which said coordinating means comprises means responsive to the rate of movement of said material for varying said first and second delay periods.]

[29. A method of inspecting continuously travelling linear material to detect defects therein, which comprises moving said material successively past an upstream inspecting unit and a downstream inspecting unit spaced a selected distance apart in the direction of linear movement of the material, each of said units being operable to detect a defect of predetermined nature in said material and thereupon produce an output signal, continuously operating said upstream unit to inspect said material for defects as it moves past said upstream unit while maintaining said downstream unit inactive, initiating linear measurement of said material moving past said inspecting unit upon production of an output signal by said upstream unit, continuing the linear measurement of said material and activating said downstream inspecting unit only when the material has moved a distance slightly less than the distance between said units measured along the path of travel of said material and rendering said downstream unit again inactive when the material has moved a distance slightly greater than said distance between said units, whereby an output signal is produced by said second unit only when both units detect a defect in substantially the same linear location on the material.]

*30. A method of inspecting a sheet of yarn to detect defects in said yarn, which comprises linearly moving said yarn sheet normally at a constant speed successively past an upstream inspecting station and a downstream inspecting station, guiding the yarn of said sheet at each of said stations to flatten the yarn sheet, directing a beam of light across the flattened yarn sheet at each of said stations from a light source located at one side edge of the yarn sheet onto the light sensitive element of a photodetector located at the opposite side edge of the yarn sheet so that variations in the light beam caused by yarn defects or by transient disturbances in the yarn sheet such as "jumping yarn" produce variations in the light received by the light sensitive element of said photodetector, sensing by said photodetector variations in light caused by such yarn defects or disturbances in the yarn sheet to produce an electrical signal upon predetermined change in the light sensed by said photodetector, continuously operating the upstream photodetector, delaying any signal produced by said photodetector at the upstream station by a time approximately equal to the time required for said yarn sheet to move at said constant speed from said upstream station to said downstream station and producing an output signal only when said delayed signal approximately coincides with a signal produced by the photodetector at the downstream station whereby a yarn defect of predetermined magnitude produces signals successively at both of said inspecting stations in predetermined sequence to thereby produce an output signal whereas a transient disturbance does not produce signals successively at both inspecting stations in said predetermined sequence and hence does not produce an output signal.*

*31. A method of inspecting a sheet of yarn to detect defects in said yarn, which comprises linearly moving said yarn sheet normally at a constant speed successively past an upstream inspecting station and a downstream inspecting station, guiding the yarn of said sheet at each of said stations to flatten the yarn sheet, directing a beam of light across the flattened yarn sheet at each of said stations from a light source located at one side edge of the sheet onto the light sensitive element of a photodetector located at the opposite side edge of the sheet so that variations in the light beam caused by yarn defects or by transient disturbances in the yarn sheet such as "jumping yarn" produce variations in the light received by the light sensitive element of said photodetector, sensing by said photodetector variations in light caused by such yarn defects or disturbances in the yarn sheet to produce an electrical signal upon predetermined change in the light sensed by said photodetector, continuously operating the upstream photodetector, and coordinating the operation of said photodetectors at said upstream station and said downstream station to produce an output signal only when a signal from the photodetector at said downstream station occurs during an interval which begins at a time slightly less than and ends at a time slightly more than the time required for said yarn sheet to travel at said constant speed from the upstream station to the downstream station whereby a yarn defect of predetermined magnitude produces signals successively at both of said inspecting stations in predetermined sequence to thereby produce an output signal whereas a transient disturbance does not produce signals successively at both inspecting stations in said predetermined sequence and hence does not produce an output signal.*

*32. A method of inspecting a sheet of yarn to detect defects in said yarn, which comprises linearly moving said yarn sheet normally at a constant speed successively past an upstream inspecting unit and a downstream inspecting unit, each of said inspecting units comprising means for guiding the yarn of said sheet to flatten the yarn sheet, directing a beam of light across the flattened yarn sheet from a light source located at one side edge of the yarn sheet onto the light sensitive element of a photodetector located at the opposite side edge of the yarn sheet so that variations in the light beam caused by yarn defects or by transient disturbances in the yarn sheet such as "jumping yarn" produce variations in the light received by the light sensitive element of said photodetector, sensing by said photodetector variations in light caused by such yarn defects or disturbances in the yarn sheet to produce an electrical signal upon predetermined change in the light sensed by said photodetector, continuously operating said upstream unit controlling a delay means by said upstream inspecting unit to initiate operation of said delay means by a said signal from said upstream inspecting unit to measure a first delay period ending at a time slightly less than the time required for the yarn sheet to travel at said sonstant speed from said upstream unit to said downstream unit and a second delay period ending at a time slightly greater than said time required for the yarn sheet to travel at said constant speed from said upstream unit to said downstream unit, and controlling said downstream inspecting unit by said delay means to disable said downstream unit at all times except for a selected short interval beginning at the end of said first period and ending at the end of said second period, whereby said downstream unit is enabled to produce an output signal for only a short interval during which a yarn defect detected by said upstream unit will appear at said downstream unit so that an output signal is produced when a yarn defect of predetermined magnitude is detected successively by both of said inspecting units in predetermined sequence but not by transient disturbances in the yarn sheet.*

*33. A method according to claim 32, in which the lengths of said first and second periods are variable and are set according to the speed of movement of said yarn sheet and the distance between said units.*

*34. A method according to claim 32, in which said second delay period is started at the end of said first delay period, whereby said delay periods occur sequentially.*

*35. A method of inspecting a moving yarn sheet to detect defects in the yarn, which comprises linearly moving the yarn sheet successively past an upstream inspecting unit and a downstream inspecting unit spaced a selected distance apart in the direction of linear movement of the yarn sheet, each of said units comprising means for guiding the yarn of said sheet to flatten the yarn sheet, directing a beam of light across the flattened yarn sheet from a light source located at one side edge of the yarn sheet onto the light sensitive element of a photodetector located at the opposite side edge of the yarn sheet so that variations in the light beam caused by yarn defects or by transient disturbances in the yarn sheet such as "jumping yarn" produce variations in the light received by the light sensitive element of said photodetector, sensing by said photodetector variations in light caused by such yarn defects or disturbances in the yarn sheet to produce an electrical signal upon predetermined change in the light sensed by said photodetector, continuously operating said upstream unit to inspect said yarn sheet, initiating linear measurement of said yarn sheet moving past said inspecting units upon production of a said signal by said upstream unit, continuing the linear measurement of said yarn sheet only until the length measured is slightly greater than the distance between said inspecting units, and producing an output signal only when a signal is produced by the photodetector of said downstream unit in the interval between the time said length measured is slightly less than the distance between said units and the time said length measured is slightly greater than said distance, whereby an output signal is produced when a yarn defect of predetermined magnitude is detected successively by both of said inspecting units in predetermined sequence but not by transient disturbances in the yarn sheet.*

*36. An inspecting system for detecting yarn defects in a sheet of yarn travelling normally at a selected constant speed, comprising first and second detecting means located respectively at an upstream inspecting station and a spaced downstream inspecting station on the path of travel of said yarn sheet, each of said detecting means comprising means for guiding the yarn of said yarn sheet at the respective inspecting station to flatten the yarn sheet, a light source positioned at one side edge of said flattened yarn sheet, a photodetector positioned at the opposite side edge of said sheet and having a light sensitive element, and means for directing a beam of light across the flattened yarn sheet from said light source onto the light sensitive element of said protodetector so that variations in the light beam caused by yarn defects or by transient disturbances in the yarn sheet such as "jumping yarn" produce variations in the light received by the light sensitive element of said photodetector, said photodetector sensing variations in light caused by such yarn defects or disturbances in the yarn sheet to produce an electrical signal upon predetermined change in the light sensed by said photodetector, said first detecting means operating continuously, and coordinating means interconnecting said first and second detecting means comprising means for delaying any signal produced by the photodetector at the upstream inspecting station by a time approximately equal to the time required for said yarn sheet to travel at said constant speed from said upstream station to said downstream station and means for producing an output signal only when said delayed signal approximately coincides with a signal produced by said photodetector at said downstream station whereby a yarn defect of predetermined magnitude produces signals successively at both of said inspecting stations in predetermined sequence to thereby produce an output signal whereas a transient disturbance does not produce signals successively at both inspecting stations in said predetermined sequence and hence does not produce an output signal.*

*37. An inspecting system for detecting yarn defects in a sheet of yarn travelling normally at a selected constant speed, comprising first and second detecting means located respectively at an upstream inspecting station and a spaced downstream inspecting station on the path of travel of said yarn sheet, each of said detecting means comprising means for guiding the yarn of said yarn sheet at the respective inspecting station to flatten the yarn sheet, a light source positioned at one side edge of said flattened yarn sheet, a photodetector positioned at the opposite side edge of said sheet and having a light sensitive element, and means for directing a beam of light across the flattened yarn sheet from said light source onto the light sensitive element of said photodetector so that variations in the light beam caused by yarn defects or by transient disturbances in the yarn sheet such as "jumping yarn" produce variations in the light received by the light sensitive element of said photodetector, said photodetector sensing variations in light caused by such yarn defects or disturbances in the yarn sheet to produce an electrical signal upon predetermined change in the light sensed by said photodetector, said first detecting means operating continuously, and coordinating means interconnecting said first and second detecting means comprising means for puroducing an output signal only when a signal from the photodetector of the detecting means at said downstream station occurs during an interval which begins at a time slightly less than and end at a time slightly more than the time required for said yarn sheet to travel at said constant*

*speed from the upstream station to the downstream station whereby a yarn defect of predetermined magnitude produces signals successively at both of said inspecting stations in predetermined sequence to thereby produce an output signal whereas a transient disturbance does not produce signals successively at both inspecting stations in said predetermined sequence and hence does not produce an output signal.*

*38. An inspecting system for detecting yarn defects in a sheet of yarn travelling normally at a selected constant speed, comprising a first inspecting unit located on the path of travel of said yarn sheet and a second inspecting unit located on the path of travel of said yarn sheet at a selected distance downstream of the first inspecting unit, each of said inspecting units comprising means for guiding the yarn to flatten said yarn sheet, a light source positioned at one side edge of said flattened yarn sheet, a photodetector positioned at the opposite side edge of said sheet and having a light sensitive element, and means for directing a beam of light across the flattened yarn sheet from said light source onto the light sensitive element of said photodetector so that variations in the light beam caused by yarn defects or by transient disturbances in the yarn sheet such as "jumping yarn" produce variations in the light received by the light sensitive element of said photodetector, said photodetector sensing variations in light caused by such yarn defects or disturbances in the yarn sheet to produce an electrical signal upon predetermined change in the light sensed by said photodetector, said first inspecting unit operating continuously to inspect said yarn sheet as it passes said first unit, and means for coordinating the operation of said first inspecting unit and said second inspecting unit, said coordinating means comprising delay means for providing a first delay period ending at a time slightly less than the time required for said yarn sheet to travel at said constant speed from said first inspecting unit to said second inspecting unit and a second delay period ending at a time slightly greater than said time required for said yarn sheet to travel at said constant speed from said first inspecting unit to said second inspecting unit, said delay means being normally inactive, means connecting said delay means with said first inspecting unit to activate said delay means when a signal is produced by said photodetector of said first inspecting unit, and means controlled by said delay means to produce an output signal only when a signal is produced by the photodetector of said second inspecting unit in the interval between the end of said first delay period and the end of said second delay period, whereby an output signal is produced when a yarn defect of predetermined magnitude is detected successively by both of said inspecting units in predetermined sequence but not by transient disturbances in the yarn sheet.*

*39. An inspecting system according to claim 38, in which said delay means comprises a first delay circuit providing said first delay period and a second delay circuit providing said second delay period and means interconnecting said circuits to start said second delay period at the end of said first delay period.*

*40. An inspecting system according to claim 38, in which said coordinating means includes means for selectively setting the lengths of said first delay period and said second delay period.*

*41. An inspecting system according to claim 38, in which said coordinating means comprises means responsive to the rate of travel of said yarn sheet for varying said first and second delay periods according to said rate.*

*42. An inspecting system according to claim 38, in which said coordinating means includes means responsive to the travel of said yarn sheet to control the lengths of said first and second delay periods.*

*43. An inspecting system according to claim 42, in which said means responsive to travel of said yarn sheet comprises pulse generating means coordinated with the travel of said yarn sheet to generate a selected number of pulses per unit length of yarn passing said inspecting units and means responsive to said pulses to provide a control signal when a predetermined number of pulses have occurred to end said first delay period.*

*44. An inspecting system according to claim 43, in which said means responsive to said pulses comprises a digital counter.*

*45. An inspecting system according to claim 43, in which said means responsive to said pulses comprises means to provide a second control signal to end said second delay period.*

*46. An inspecting system according to claim 43, in which said pulse generating means comprises a rotatable member driven in coordination with said yarn sheet and having a selected number of circumferentially spaced discontinuities, and a detector positioned to sense the sequential passage of said discontinuities past said detector.*

*47. An inspecting system according to claim 46, in which said detector is photoelectric.*

*48. An inspecting system according to claim 44, further comprising means for starting the travel of said yarn sheet and means connecting said starting means with said counting means to reset said counting means when travel of said yarn sheet is started.*

*49. An inspecting system according to claim 40, in which said means for selectively setting the lengths of said first and second delay periods comprises first means for selectively varying said first delay period, second means for selectively varying said second delay period and means interconnecting said first and second means to vary said first and second delay periods in predetermined relation to one another.*

*50. An inspecting system according to claim 38, in which said delay means comprises a first one-shot multivibrator including a delay circuit providing said first delay period and a second one-shot multivibrator including a delay circuit providing said second delay period.*

*51. An inspecting system according to claim 50, in which each of said delay circuits includes a variable component for varying the respective delay period and means for varying said components.*

*52. An inspecting system according to claim 51, comprising means interconnecting said means for varying said variable components of said delay circuits to vary said first and second delay periods in predetermined relation to one another.*

*53. An inspecting system according to claim 50, comprising means responsive to the speed of travel of said yarn sheet and means connecting said speed responsive means with said delay means to determine said delay periods according to the speed detected by said speed responsive means.*

*54. An inspecting system for detecting yarn defects in a yarn sheet travelling lengthwise along a selected path comprising a first inspecting unit located on the path of travel of said yarn sheet and a second inspecting unit located on the path of travel of said yarn sheet at a selected distance downstream of the first inspecting unit, each of said inspecting units comprising means for guiding the yarn to flatten said yarn sheet, a light source positioned at one side of said flattened yarn sheet, a photodetector positioned at the opposite side edge of said sheet and having a light sensitive element, and means for directing a beam of light across the flattened yarn sheet from said light source onto the light sensitive element of said photodetector so that variations in the light beam caused by yarn defects or by transient disturbances in the yarn sheet such as "jumping yarn" produce variations in the light received by the light sensitive element of said photodetector, said photodetector sensing variations in light caused by such yarn defects or disturbances in the yarn sheet to produce an electrical signal upon predetermined change in the light sensed by said photodetector, said first inspecting unit operating continuously*

*to inspect said yarn sheet as it passes said first unit, and means for coordinating the operation of said first inspecting unit and said second inspecting unit, said coordinating means comprising means for measuring the linear travel of said yarn sheet past said inspecting units, means connecting said measuring means with said first inspecting unit to start measurement of said travel of said yarn sheet past said inspecting units upon production of a said signal by the photodetector of said first inspecting unit, continuing the measurement of linear travel of said yarn sheet only until the length measured is slightly greater than the distance between said inspecting units, and means controlled by said measuring means to produce an output signal only when a signal is produced by the photodetector of said second inspecting unit in the interval between the time said length of travel measured by said measuring means is slightly less than the distance between said units and the time said length measured by said measuring means is slightly greater than said distance, whereby an output signal is produced when a yarn defect of predetermined magnitude is detected successively by both of said inspecting units in predetermined sequence but not by transient disturbances in the yarn sheet.*

*55. An inspecting system according to claim 54, in which said measuring means comprises means for generating a signal pulse for each selected increment of travel of said yarn sheet past said inspecting units and means responsive to said pulses to provide a first control signal to determine the beginning of said interval when a predetermined number of pulses have occurred and to provide a second control signal to determine the end of said interval when a predetermined greater number of pulses have occurred.*

*56. An inspecting system according to claim 55, in which said means responsive to said pulses to provide said first and second signals comprises a digital counter for counting said pulses.*

*57. An inspecting system according to claim 56, comprising means for resetting said digital counter when a signal is produced by the photodetector of said second inspecting unit during said interval.*

*58. An inspecting system according to claim 56, comprising means responsive to said second control signal to stop the counting and reset the counter at the end of said interval if no signal is produced by the photodetector of said second inspecting unit during said interval.*

*59. An inspecting system according to claim 54, in which said first inspecting unit is of simple design while said second inspecting unit comprises means for detecting different magnitudes of defects and the number of defects per unit length.*

References Cited

The following references, cited by the Examiner, are of record in the patented file of this patent or the original patent.

UNITED STATES PATENTS

| | | | |
|---|---|---|---|
| 3,447,213 | 6/1969 | Dost et al. | 250—564 X |
| 3,409,779 | 11/1968 | Fertig | 250—562 |
| 3,411,008 | 11/1968 | Coombes et al. | 118—4 |
| 3,619,578 | 11/1971 | George | 250—562 X |
| 3,274,882 | 9/1966 | Kreiger et al. | 250—562 X |
| 3,428,817 | 2/1969 | Hofmeister et al. | 356—160 X |
| 3,558,900 | 1/1971 | Moskowitz | 356—237 X |

WALTER STOLWEIN, Primary Examiner

U.S. Cl. X.R.

250—209; 356—238; 28—51